United States Patent
Kravitz et al.

(10) Patent No.: US 10,362,303 B2
(45) Date of Patent: Jul. 23, 2019

(54) SENSOR-ASSISTED AUTOFOCUS CALIBRATION

(71) Applicant: Apple Inc., Cupertino, CA (US)

(72) Inventors: Daniel Kravitz, Petah Tikva (IL); Niv Gilboa, Ra'anana (IL); Yohai Zmora, Ganei Tikva (IL); Zafrir Mor, Ein Habsor (IL); Jonathan Pokrass, Bat Yam (IL)

(73) Assignee: APPLE INC., Cupertino, CA (US)

( * ) Notice: Subject to any disclaimer, the term of this patent is extended or adjusted under 35 U.S.C. 154(b) by 285 days.

(21) Appl. No.: 14/557,476

(22) Filed: Dec. 2, 2014

(65) Prior Publication Data

US 2015/0156485 A1 Jun. 4, 2015

Related U.S. Application Data

(60) Provisional application No. 61/910,998, filed on Dec. 3, 2013.

(51) Int. Cl.
| | |
|---|---|
| *H04N 17/00* | (2006.01) |
| *H04N 5/232* | (2006.01) |
| *H04N 5/225* | (2006.01) |
| *G03B 13/36* | (2006.01) |

(52) U.S. Cl.
CPC ........... *H04N 17/002* (2013.01); *G03B 13/36* (2013.01); *H04N 5/2257* (2013.01); *H04N 5/23212* (2013.01)

(58) Field of Classification Search
CPC ........... G03B 43/00–02; H04N 17/002; H04N 5/23212; G06T 7/0018–002; G02B 7/28

USPC ............ 348/357, 187, 345; 396/79, 133, 97
See application file for complete search history.

(56) References Cited

U.S. PATENT DOCUMENTS

| 8,446,475 | B2 | 5/2013 | Topliss et al. | |
|---|---|---|---|---|
| 2005/0063694 | A1* | 3/2005 | Nakazawa | G02B 7/028 396/97 |
| 2009/0245768 | A1* | 10/2009 | Uenaka | G03B 17/00 396/53 |
| 2010/0321506 | A1 | 12/2010 | Li et al. | |
| 2011/0128402 | A1* | 6/2011 | Lim | H04N 5/2256 348/222.1 |
| 2012/0019675 | A1* | 1/2012 | Brown | G02B 27/646 348/208.2 |
| 2012/0163784 | A1* | 6/2012 | Saito | G02B 27/646 396/55 |
| 2012/0268645 | A1* | 10/2012 | Chen | H04N 5/23212 348/345 |
| 2013/0076967 | A1* | 3/2013 | Brunner | H04N 1/2112 348/345 |

(Continued)

OTHER PUBLICATIONS

Zhang, Z., "A flexible new technique for camera calibration," IEEE Transactions on Pattern Analysis and Machine Intelligence, vol. 22, Issue 11, pp. 1330-1334, year 2000.

(Continued)

*Primary Examiner* — Xi Wang (74) *Attorney, Agent, or Firm* — Kugler & Associates (57) ABSTRACT

A mobile device includes a camera module, including a lens and an image sensor. An inertial sensor in the mobile device outputs a signal indicative of an orientation of the device. A controller corrects one or more focal properties of the camera module responsively to the orientation indicated by the inertial sensor.

20 Claims, 4 Drawing Sheets

(56) References Cited

U.S. PATENT DOCUMENTS

2014/0268361 A1 9/2014 Nunnink et al.
2015/0138430 A1* 5/2015 Ogura .................. H04N 5/2328
                                                    348/349

OTHER PUBLICATIONS

Goma, S., "A 3D camera solution for mobile platforms", For Qualcomm MM R&D team, 51 pages, Feb. 14, 2011.

* cited by examiner

SENSOR-ASSISTED AUTOFOCUS CALIBRATION

CROSS-REFERENCE TO RELATED APPLICATION

This application claims the benefit of U.S. Provisional Patent Application 61/910,998, filed Dec. 3, 2013, which is incorporated herein by reference.

FIELD OF THE INVENTION

The present invention relates generally to devices and methods for image capture, and specifically to adjustment of and compensation for variations in focal properties of imaging devices.

BACKGROUND

Most electronic cameras that are currently on the market include an autofocus mechanism in order to produce sharp images over a range of object distances. Typically, an electronic controller receives an indication from a sensor (which may be the image sensor of the camera itself or an external sensor) of the necessary focus adjustment, and drives a electromechanical element to adjust the focal distance of the camera optics accordingly. Even the tiny camera modules that are integrated in smartphones have autofocus capability, typically using a voice-coil motor (VCM) to adjust the distance between the camera lens and the image sensor.

U.S. Patent Application Publication 2010/0321506 describes a set of calibration procedures that can be run to assist in calibrating a camera module, such as may be intended for installation into a mobile consumer device. The procedures include lens shading calibration, white balance calibration, light source color temperature calibration, auto focus macro calibration, static defect pixel calibration, and mechanical shutter delay calibration. Each of these procedures may generate data that can be potentially be stored in non-volatile memory on board the camera module for use during operation.

SUMMARY

Embodiments of the present invention that are described hereinbelow provide improved methods and systems for calibration of camera modules used in mobile devices.

There is therefore provided, in accordance with an embodiment of the present invention, a mobile device, which includes a camera module, including a lens and an image sensor. An inertial sensor is configured to output a signal indicative of an orientation of the device. A controller is configured to correct one or more focal properties of the camera module responsively to the orientation indicated by the inertial sensor.

In some embodiments, the one or more focal properties corrected by the controller include a distance between the lens and the image sensor, which varies in response to the orientation. In one embodiment, the camera module includes an autofocus mechanism, and the controller is configured to adjust the autofocus mechanism responsively to the orientation in order to correct for variations in the distance between the lens and the image sensor. Additionally or alternatively, the one or more focal properties corrected by the controller include a transverse displacement between the lens and the image sensor, which varies in response to the orientation.

In a disclosed embodiment, the device includes a temperature sensor, wherein the controller is configured to apply a further correction to the one or more focal properties responsively to a temperature indicated by the temperature sensor.

In some embodiments, the controller is configured to correct the one or more focal properties by processing electronic images output by the camera module so as to correct for variations in the one or more focal properties.

There is also provided, in accordance with an embodiment of the present invention, a method for imaging, which includes capturing electronic images using a camera module in a mobile device, the camera module including a lens and an image sensor. A signal is received, from an inertial sensor in the mobile device, indicative of an orientation of the device. One or more focal properties of the camera module are corrected responsively to the orientation indicated by the inertial sensor.

There is additionally provided, in accordance with an embodiment of the present invention, a method for calibration, which includes mounting a camera module, including an image sensor and a lens, in a calibration jig containing a target at a fixed distance from the mounted camera module. The jig is rotated to a plurality of different orientations, and at each orientation, measuring a deviation in one or more focal properties of the camera module as a function of orientation. The camera module is installed in a mobile device that includes an inertial sensor. Based on the measured deviation, calibration parameters to be applied in correcting the one or more focal properties of the camera module are computed and stored in the mobile device responsively to the orientation measured by the inertial sensor.

Typically, the camera module includes an autofocus mechanism, and computing the calibration parameters includes correcting for changes in the focal properties due to the autofocus mechanism. The autofocus mechanism may be modeled as a spring.

In a disclosed embodiment, the method includes measuring the deviation in the one or more focal properties of the camera module as a function of temperature, and computing the calibration parameters includes correcting for changes in the one or more focal properties due to variations in the temperature.

Correcting the one or more focal properties typically includes correcting for variations in a distance between the lens and the image sensor and/or for a transverse displacement between the lens and the image sensor.

The present invention will be more fully understood from the following detailed description of the embodiments thereof, taken together with the drawings in which:

DETAILED DESCRIPTION OF EMBODIMENTS

Low-cost auto-focus mechanisms, such as VCM-based mechanisms that are commonly used in camera modules in smartphones, are sensitive to external forces, including gravity, and temperature changes, which can affect the focal properties of the camera module. In other words, just turning the camera module (or the mobile device in which the module is installed) on its side can change its focal properties due to the change in the direction of gravitational pull on the components of the module. For simple picture taking, the resulting image distortion or shift may not be significant. When the output images are to be analyzed and used in measurements, however, these changes in focal properties can affect measurement accuracy. For example, when an image of a projected pattern is processed and compared to a reference image for purposes of depth mapping, small shifts and distortion of pattern features can lead to large errors in depth estimation. For this reason, auto-focus camera modules are not generally used in measurement applications.

At the same time, most smartphones and other mobile devices contain an inertial measurement units (IMU) with sensors, such as accelerometers, that can be used to measure the device orientation. Many device include temperature sensors, such as thermistors, as well. These components are commonly used in controlling other aspects of device operation, unrelated to the imaging functions of the camera module.

Embodiments of the present invention that are described herein take advantage of the existing IMU, and possibly the temperature sensor, as well, in correcting for changes in the focal properties of the camera module. For this purpose, the dependence of the focal properties on orientation and possibly temperature is calibrated in advance, and corresponding calibration parameters are stored in the mobile device. These calibration parameters are then used in correcting the focal properties based on the measurements of orientation and temperature that are provided by the IMU and temperature sensor in the mobile device. In this manner, it is possible to make accurate measurements based on processing of image features even when using a low-cost camera module with a simple auto-focus mechanism, such as a VCM.

The disclosed embodiments thus provide a mobile device, such as a smart phone, tablet computer, or compact camera, which comprises a camera module, comprising a lens and an image sensor. The mobile device also comprises an inertial sensor, which outputs a signal indicative of the orientation of the device. A controller in the device is configured to correct one or more focal properties of the camera module based on the orientation indicated by the inertial sensor. The term "focal properties," in the context of the present description and in the claims, include the distance between the lens and the image sensor and transverse displacement between the lens and the image sensor, both of which may vary in response to the orientation.

The correction applied by the controller may take several forms. For example, the controller may adjust the autofocus mechanism responsively to the orientation in order to correct for variations in the distance between the lens and the image sensor. Additionally or alternatively, the controller may process electronic images output by the camera module in such a manner as to correct for variations in the focal properties.

In some embodiments, as noted above, the mobile device comprises a temperature sensor, and the controller applies a further correction to the focal properties based on the temperature indicated by the temperature sensor.

To enable the sort of functionality that is described above, some embodiments of the present invention provide a method for calibration in which a camera module is mounted in a calibration jig containing a target at a fixed distance from the camera module. The jig is rotated to multiple different orientations, and at each orientation, deviations in one or more focal properties of the camera module are measured as a function of orientation. These measurements are applied in computing calibration parameters, which are stored in the mobile device in which the camera module is installed. Using the readings of orientation provided by the inertial sensor, the controller of the mobile device applies the calibration parameters in correcting the focal properties of the camera module, as described above. The calibration may be performed individually for each camera module or only for a representative sample of the camera modules on a production line. Temperature effects may also be taken into account and calibrated as a part of the method.

Figure 1:
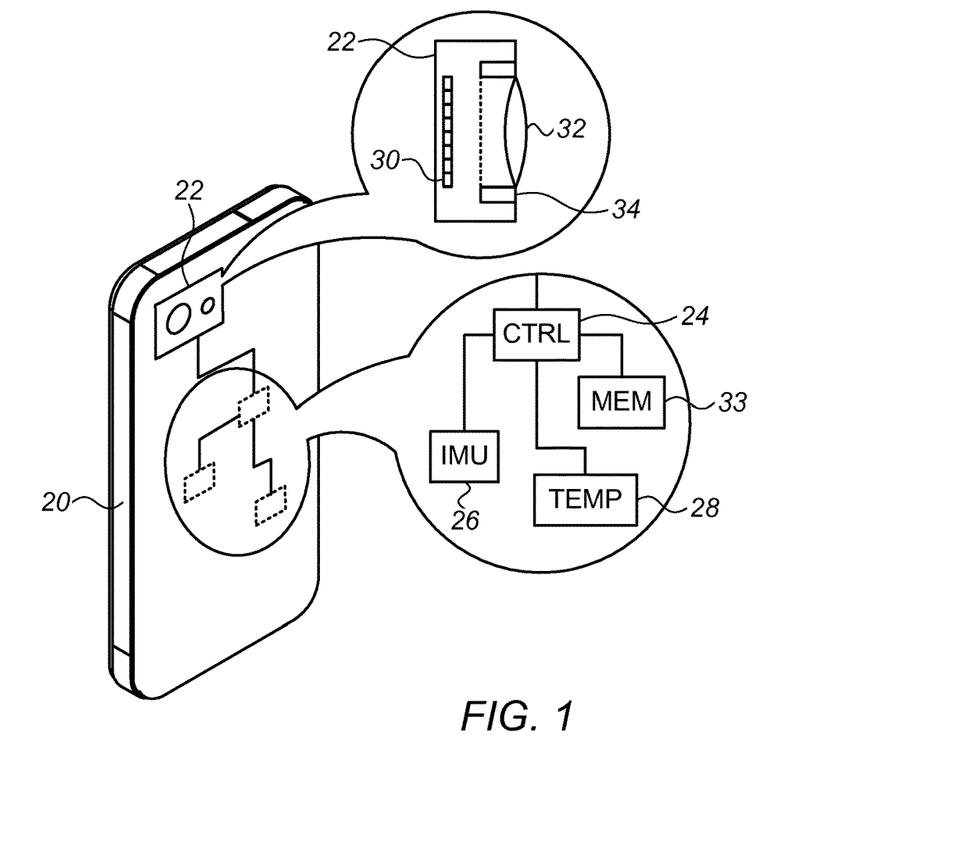
FIG. 1 is a block diagram that schematically illustrates elements of a mobile computing device with a calibrated camera module, in accordance with an embodiment of the present invention.

FIG. 1 is a block diagram that schematically illustrates elements of a mobile computing device 20 with a calibrated camera module 22, in accordance with an embodiment of the present invention. Computing device 20 in this example has the form of a smart phone, but as explained earlier, may comprise any sort of suitable portable device. Computing device 20 comprises a controller 24, typically a microprocessor with suitable interfaces, along with peripheral components that include an IMU 26, a temperature sensor 28, and a memory 33, inter alia.

Camera module 22 comprises an image sensor 30, such as a CMOS photodetector matrix, and an objective lens 32, which focuses optical images onto sensor 30. Although for the sake of simplicity, only a single lens element is shown in the figure, lens 32 typically comprises a compound lens, as is known in the art. An autofocus mechanism 34, such as a VCM or other motor, adjusts the distance between lens 32 and sensor 30 depending on the object distance. The autofocus function is typically operated by controller 24 based either on analysis of images provided by camera module 22 or on signals provided by a separate distance sensor (not shown).

Figure 2:
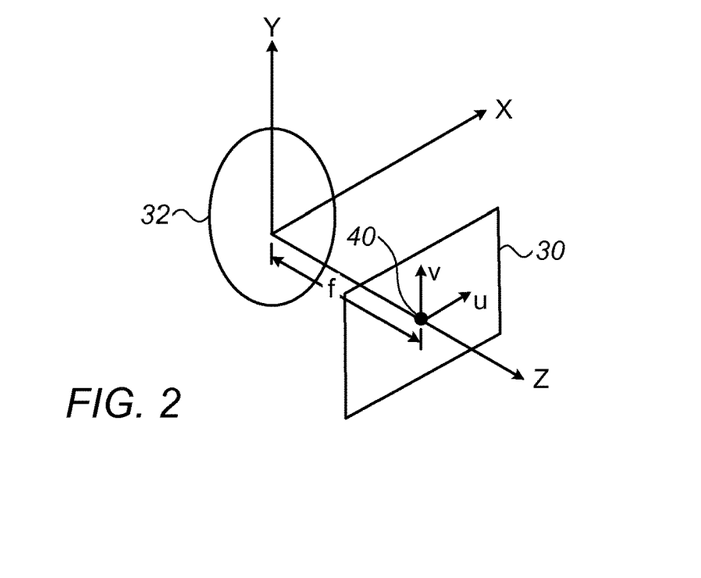
FIG. 2 is a plot showing focal parameters used in calibration of a camera module, in accordance with an embodiment of the present invention.

FIG. 2 is a plot showing focal parameters used in calibration of camera module 22, in accordance with an embodiment of the present invention. These focal parameters are used in quantifying corresponding focal properties of the camera module that are calibrated and corrected for in the disclosed embodiments. The distance between the image sensor 30 and lens 32 is denoted by f. The principal axes in the plane of the image sensor, which is typically transverse to the focal axis, have an origin 40 denoted by $u_0$, $v_0$ at the center of the image sensor. The calibration procedure described below measures these focal parameters and their dependence on orientation and temperature of the camera module, as well as nonlinear focal properties of the lens, such as distortion.

Figure 3:
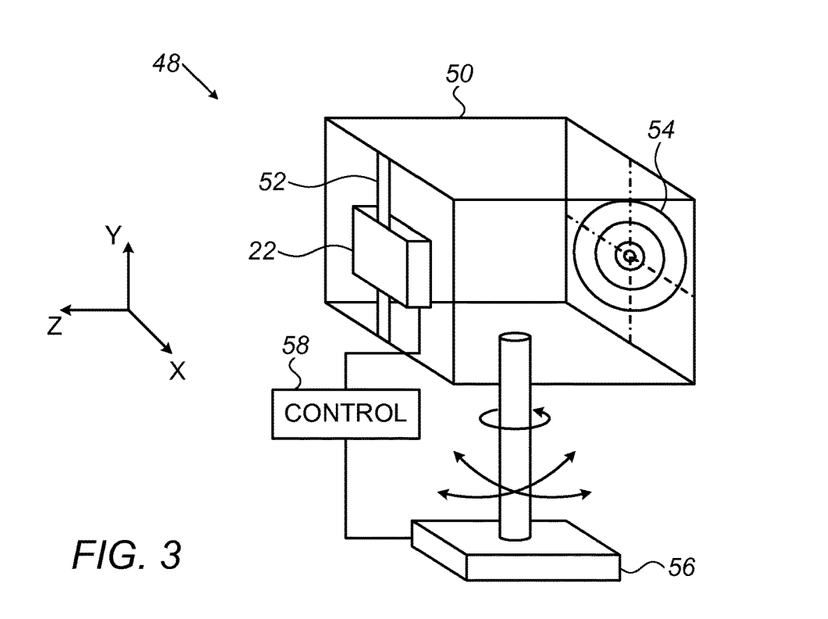
FIG. 3 is a schematic, pictorial illustration of a calibration jig, in accordance with an embodiment of the present invention.

FIG. 3 is a schematic, pictorial illustration of a calibration jig 48 that is used for this purpose, in accordance with an embodiment of the present invention. Jig 48 comprises a frame 50, to which camera module 22 is fastened by a mount 52. A target 54 is located in the frame at a known distance from the camera module. The target can be any printed or projected image with enough trackable features to cover the field of view of the camera module. In the pictured embodiment, camera module 22 is calibrated as a separate assembly, before it is installed in mobile device 20. Alternatively, jig 48 and the calibration procedures described herein may be applied, mutatis mutandis, to calibration of camera module 22 after it has been installed in a mobile device.

Frame 50 is held by a rotatable mount 56, which is capable of rotating the frame to any desired orientation about the X, Y and Z axes. In order to measure the sensitivity of the focal properties of camera module 22 to acceleration in different directions, in this case gravitational acceleration, a controller 58 rotates frame 50 around the different axes at different angles in order to map all possible orientations. Camera module 22 and target 54 rotate simultaneously in jig 48. In this manner, the controller is able to measure and quantify the focal properties including transverse displacement of $u_0$, $v_0$ (referred to as DX, DY) and variations in f (referred to as DZ), as related to the IMU and thermistor readings. Jig 48 may also comprise a heating and/or cooling element (not shown) for varying the temperature at which the measurements are made.

Thus, by analyzing the differences in the images produced by camera module 22 of target 54 in jig 48 at different orientations and/or temperatures, it is possible to find the displacement of the focal parameters as a function of the orientation and/or temperature. If the whole image shifts by DX, DY pixels, then we know that origin 40 ($u_0$, $v_0$) has moved by DX, DY pixels. If the image scales (expands or shrinks), it means that f has changed, and from the calculated scale value and the parameters of lens 32 it is possible to calculate DZ.

Figure 4:
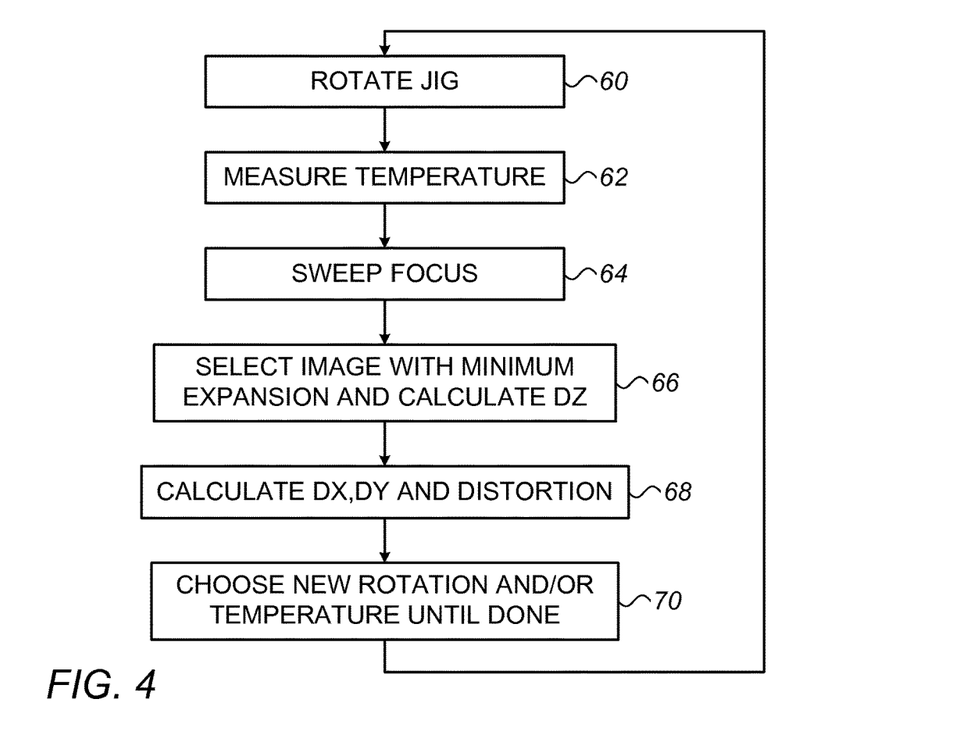
FIG. 4 is a flow chart that schematically illustrates a method for calibrating a camera module, in accordance with an embodiment of the present invention.

FIG. 4 is a flow chart that schematically illustrates a method for calibrating camera module 22 in jig 48, in accordance with an embodiment of the present invention. Controller 58 rotates jig 48 to a desired orientation, at a rotation step 60. Assuming temperature is also being taken into account in the calibration, controller 58 measures and records the temperature of the camera module, as well, at a temperature measurement step 62. Because camera module 22 is not telecentric, for each setting of autofocus mechanism 34, the image will expand or shrink accordingly. In order to eliminate this effect and distinguish better between scale (DZ) and transverse shift (DX, DY) and distortion, controller 58 sweeps autofocus mechanism 34 through a range of settings and captures images at the different settings, at a focus sweeping step 64.

Following this sweep, controller 58 selects the image with minimum expansion of the target pattern, at an image selection step 66. Based on the selected image, the controller calculates the focal shift DZ. The effective focal length of a lens is affected by temperature. Therefore, controller 58 may also assess the relation between the temperature and the effective focal length by changing the temperature of camera module 22 and measuring the expansion of the image. This temperature-related information is used in order to distinguish between lens displacement (DZ) and lens focal length change.

To find the transverse shift and distortion, controller 58 compares the images captured of target 54 at step 64 to a known reference image of the target pattern, at a displacement calculation step 68. The average shift of the entire pattern, relative to the reference image, gives the values of DX and DY for the current orientation and temperature values, while local pattern shifts are used to estimate distortion. Details of mathematical formalisms that may be used in computing calibration parameters relating to DX, DY and DZ are described further hereinbelow.

After completing the measurements at a given orientation and temperature, controller 58 selects the next orientation and/or temperature at which the measurements are to be made, at a test condition selection step 70. Steps 60 through 68 are then repeated until all desired test conditions have been evaluated.

Figure 5:
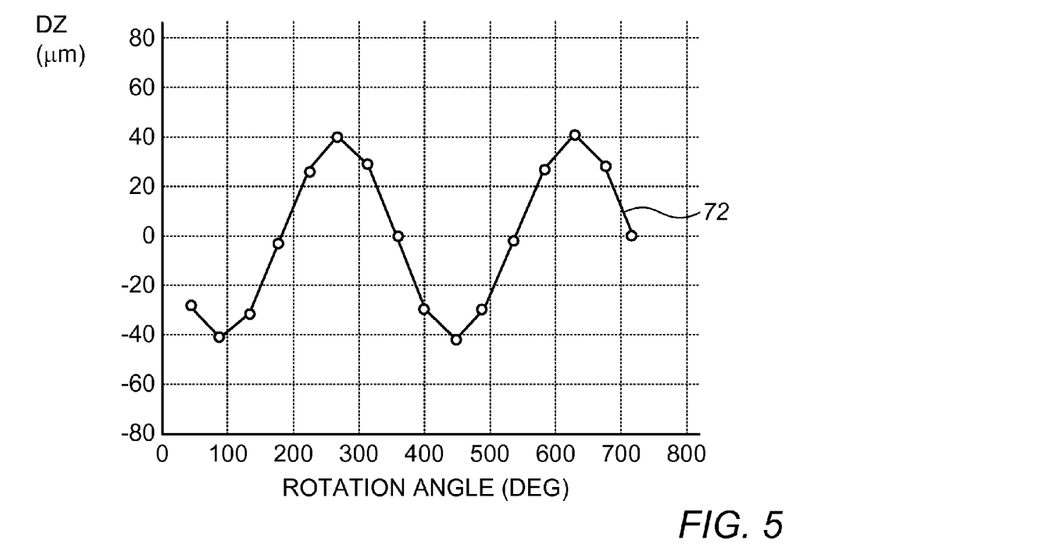
FIGS. 5 and 6 are plots that schematically show changes in the focal properties of a camera module measured in a calibration procedure, in accordance with an embodiment of the present invention.
Figure 6:
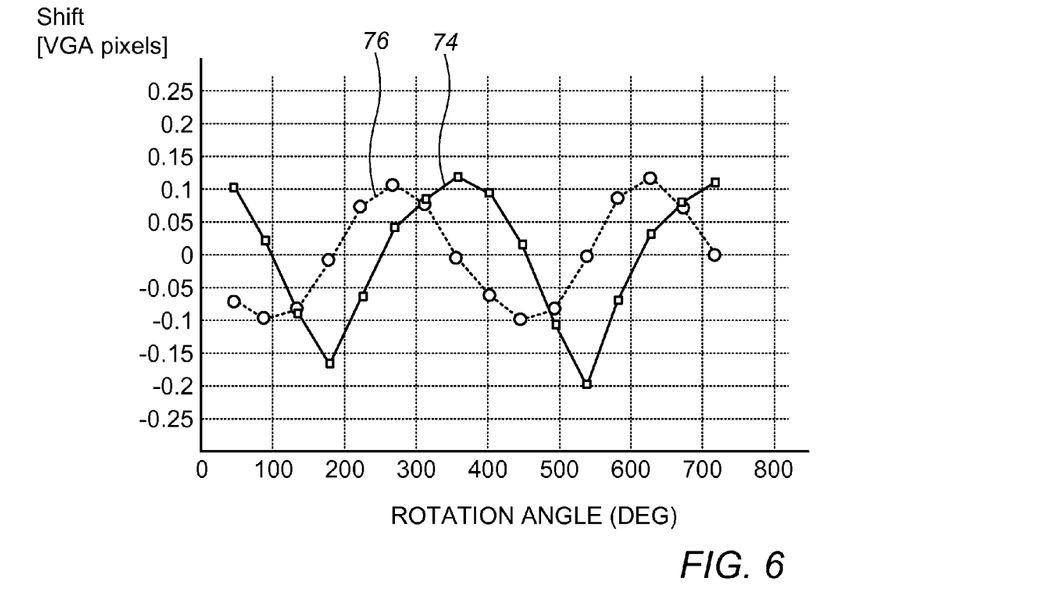

FIGS. 5 and 6 are plots that schematically show changes in the focal properties of camera module 22, measured in the calibration procedure of FIG. 4, in accordance with an embodiment of the present invention. FIG. 5 shows a curve 72 corresponding to the variation in DZ measured by turning frame 50 so that camera module 22 is located vertically above target 54, and then rotating the frame about a horizontal axis. FIG. 6 shows curves 74 and 76 corresponding respectively to the variations in DX and DY measured by rotating frame 50, starting from the orientation shown in FIG. 3, about a horizontal axis parallel to the optical axis between module 22 and target 54. It can be seen that the deviations of curves 72, 74 and 76 are roughly sinusoidal in angle, indicating that autofocus mechanism 34 can be modeled as a spring for purposes of calibration, and the calibration function for camera module 22 can be derived by fitting a sinusoid to the measurements made at steps 66 and 68.

Modeling autofocus mechanism 34 as a basic spring mass system, the displacement of the spring due to inertial force is given by equating Newton's and Hooke's laws: $ma=k\Delta x$. Here, m is the mass in kg, and a is the acceleration in $$K_x = \frac{mg}{\Delta x^{max}}$$

$$K_y = \frac{mg}{\Delta y^{max}}$$

$$K_z = \frac{mg}{\Delta z^{max}}$$

k is the spring constant in N/m, and $\Delta x$ is the spring extension in meters, corresponding to the transverse (X-Y) or lateral (Z) displacement of the lens, which is translated into X shift, Y shift or Z shift accordingly. In the absence of linear acceleration, a is simply the gravitational field vector g, with magnitude $\sqrt{G_x^2+G_y^2+G_z^2}$, wherein $G_x$, $G_y$, and $G_z$ are the readings provided by IMU 26 or another force measurement device.

Using the measurements made at steps 66 and 68 and illustrated in FIGS. 5 and 6, the spring constants are given by the equations:

$$\frac{m}{s^2}.$$

The maximum spring displacement for each axis, $\Delta x^{max}$, $\Delta y^{max}$, $\Delta z^{max}$, occurs when the axis is aligned exactly with the gravitational force. The spring constants thus derived are typically stored in memory 33 for subsequent use by controller 24 in correcting deviations in focal properties resulting from the behavior of autofocus mechanism 34. Alternatively or additionally, memory 33 may store tables of displacement values for different orientation angles.

Figure 7:
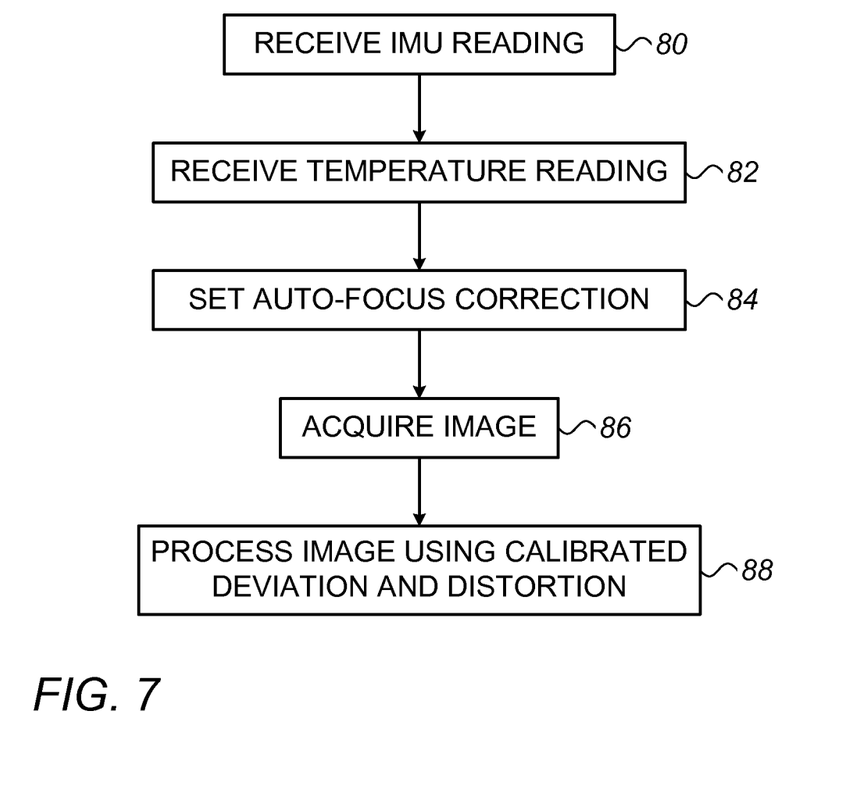
FIG. 7 is a flow chart that schematically illustrates a method for calibrated image capture and processing, in accordance with an embodiment of the present invention.

FIG. 7 is a flow chart that schematically illustrates a method for calibrated image capture and processing using the focal calibration parameters derived above, in accordance with an embodiment of the present invention. Controller 24 applies this method to determine the deviation of the focal properties of camera module 22 relative to an initial baseline. This baseline may be derived, for example, by placing the camera module in a fixed position, such as the horizontal position shown in FIG. 3, and measuring the focal properties as though module 22 was a fixed-focus camera. Any suitable method that is known in the art may be used for this purpose, such as the calibration algorithm described by Zhang, in "A flexible new technique for camera calibration," *IEEE Transactions on Pattern Analysis and Machine Intelligence* 22:11 (2000), pages 1330-1334, which is incorporated herein by reference. The readings of IMU 26 and temperature sensor 28 may also be registered and verified at this stage.

Thereafter, in order to correct the focal properties of camera module 22, controller 24 periodically receives an orientation reading from IMU 26, at an orientation input step 80. The controller may also receive a temperature reading, at a temperature input step 82. Based on these readings, the controller applies the correction function calculated in the autofocus analysis phase to the initial, baseline calibration. Using the deviation functions calculated in the calibration procedure of FIG. 4, controller 24 is able to determine, for each IMU reading, the corresponding deviations of $u_0$, $v_0$ and f: $du_0$, $dv_0$ and df. In particular, the baseline values of these focal properties may be stored in memory 33, along with the calibration parameters. Controller 24 then adds the deviations $du_0$, $dv_0$ and df, corresponding to the current orientation and temperature, to the baseline values $u_0$, $v_0$ and f, in order to find the current deviation values.

Optionally, controller 24 may apply the deviations in correcting the autofocus setting of module 22, at an autofocus correction step 84. In other words, given the orientation and temperature of mobile device 20, the controller may drive autofocus mechanism 34 to a slightly larger or smaller focal distance than it would normally select in order to compensate for orientation- and temperature-dependent offset.

Having set the autofocus (with or without compensation at step 84), controller 24 acquires an image from camera module 22, at an image acquisition step 86. In processing the image, the controller applies correction factors depending on the calculated deviations $du_0$, $dv_0$ and df, corresponding to the current orientation and temperature, at an image processing step. In this way, the changes in the focal properties due to the orientation and temperature of camera module 22 are neutralized in the measurement result, and the measurement is accurate regardless of the state of autofocus mechanism 34.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A mobile device, comprising:
a camera module, comprising a lens and an image sensor that lie along a focal axis;
an inertial sensor, which is configured to output a signal indicative of an orientation of the device; and
a controller, which is configured to correct for a displacement, between the lens and the image sensor, in a direction that is transverse to the focal axis, caused by a change in a direction of gravitational pull on components of the camera module that results from the mobile device being turned on its side, responsively to:
the signal from the inertial sensor indicating that the mobile device is being held on its side, and
stored values indicative of a dependence of the displacement on the orientation.

2. The device according to claim 1, and comprising a temperature sensor, wherein the controller is configured to correct for the displacement responsively to a temperature indicated by the temperature sensor.

3. The device according to claim 1, wherein the controller is configured to correct for the displacement by processing electronic images output by the camera module.

4. The device according to claim 1, wherein the controller is further configured to correct, responsively to the orientation indicated by the signal from the inertial sensor, for a deviation in a distance, along the focal axis, between the lens and the image sensor.

5. The device according to claim 4, wherein the controller is configured to correct for the deviation by adjusting the distance between the lens and the image sensor.

6. The device according to claim 5, wherein the camera module comprises an autofocus mechanism, and wherein the controller is configured to adjust the autofocus mechanism responsively to the orientation in order to correct for the deviation in the distance between the lens and the image sensor.

7. The device according to claim 1, wherein the stored values include tables of values of the displacement for different orientation angles of the device.

8. The device according to claim 1, wherein the stored values include constants derived by fitting a function to calibration measurements of the displacement.

9. The device according to claim 1, wherein the stored values indicate, for the orientation indicated by the signal from the inertial sensor, a corresponding deviation in a position of a center of the image sensor, and wherein the controller is configured to correct for the displacement by using the stored values to determine the deviation.

10. The device according to claim 1, wherein the stored values include calibration parameters that were derived by finding a transverse shift of an image of a target relative to a known reference image of the target.

11. A method for imaging, comprising:
capturing electronic images using a camera module in a mobile device, the camera module comprising a lens and an image sensor that lie along a focal axis;
receiving, from an inertial sensor in the mobile device, a signal indicative of an orientation of the device; and
correcting for a displacement, between the lens and the image sensor, in a direction that is transverse to the focal axis, caused by a change in a direction of gravitational pull on components of the camera module that results from the mobile device being turned on its side, responsively to:
the signal from the inertial sensor indicating that the mobile device is being held on its side, and stored values indicative of a dependence of the displacement on the orientation.

12. The method according to claim 11, wherein the mobile device comprises a temperature sensor, and wherein correcting for the displacement comprises correcting for the displacement responsively to a temperature indicated by the temperature sensor.

13. The method according to claim 11, wherein correcting for the displacement comprises processing electronic images output by the camera module.

14. The method according to claim 11, further comprising, responsively to the orientation indicated by the signal from the inertial sensor, correcting for a deviation in a distance, along the focal axis, between the lens and the image sensor.

15. The method according to claim 14, wherein correcting for the deviation comprises correcting the distance between the lens and the image sensor.

16. The method according to claim 15, wherein the camera module comprises an autofocus mechanism, and wherein correcting the distance comprises adjusting the autofocus mechanism responsively to the orientation.

17. The method according to claim 11, wherein the stored values include tables of values of the displacement for different orientation angles of the device.

18. The method according to claim 11, wherein the stored values include constants derived by fitting a function to calibration measurements of the displacement.

19. The method according to claim 11, wherein the stored values indicate, for the orientation indicated by the signal from the inertial sensor, a corresponding deviation in a position of a center of the image sensor, and wherein correcting for the displacement comprises correcting for the displacement by using the stored values to determine the deviation.

20. The method according to claim 11, wherein the stored values include calibration parameters that were derived by finding a transverse shift of an image of a target relative to a known reference image of the target.

\* \* \* \* \*